(12) United States Patent
Ando et al.

(10) Patent No.: US 8,181,678 B2
(45) Date of Patent: May 22, 2012

(54) FUELING DEVICE

(75) Inventors: Koshi Ando, Aichi-ken (JP); Koji Sugiura, Toyota (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 373 days.

(21) Appl. No.: 12/457,949

(22) Filed: Jun. 25, 2009

(65) Prior Publication Data
US 2009/0320956 A1 Dec. 31, 2009

(30) Foreign Application Priority Data
Jun. 27, 2008 (JP) .................................. 2008-168312

(51) Int. Cl.
*B65B 1/04* (2006.01)
(52) U.S. Cl. ........................ 141/286; 141/285; 220/86.3
(58) Field of Classification Search .................. 141/286; 220/86.3; 138/108
See application file for complete search history.

(56) References Cited

U.S. PATENT DOCUMENTS

| | | | | | |
|---|---|---|---|---|---|
| 1,995,007 | A | * | 3/1935 | Myers | 220/86.3 |
| 2,145,759 | A | * | 1/1939 | Fellows et al. | 220/86.3 |
| 3,991,792 | A | * | 11/1976 | Kettler | 138/108 |
| 4,630,748 | A | * | 12/1986 | Keller | 220/86.3 |
| 7,040,360 | B2 | * | 5/2006 | Watson | 141/255 |
| 7,404,498 | B2 | * | 7/2008 | Hattori et al. | 220/86.3 |
| D588,055 | S | * | 3/2009 | Moya | D12/400 |

FOREIGN PATENT DOCUMENTS

| | | |
|---|---|---|
| JP | U-61-122925 | 8/1986 |
| JP | A-07-89359 | 4/1995 |
| JP | A-11-100060 | 4/1999 |
| JP | A-2005-206117 | 8/2005 |

* cited by examiner

*Primary Examiner* — Timothy L Maust
(74) *Attorney, Agent, or Firm* — Posz Law Group, PLC

(57) ABSTRACT

The fueling device has a fueling pipe adapted to supply fuel pumped from the inlet opening the fuel tank. A grating member is situated inside the fueling pipe. The grating member includes an annular body positioned substantially concentrically with the fuel passage; and a support body adapted to support the annular body on the inside wall of the flow passage. Gaps present between the inside wall of the passage-defining member and the annular body and the support body constitute part of the fuel passage.

8 Claims, 5 Drawing Sheets

FUELING DEVICE

This application claims the benefit of and priority from Japanese Application No. 2008-168312 filed Jun. 27, 2008, the content of which is incorporated herein by reference.

BACKGROUND OF THE INVENTION

1. Field of the Invention

The present invention relates to a fueling device adapted to supply fuel to a fuel tank.

2. Description of the Related Art

In the prior art, it has been known to provide a fuel tank of an automobile with an anti-theft mechanism (JP 11-100060A). The mechanism comprises a grating member with parallel bars adapted to be installed in the fuel passage of the inlet pipe in order to prevent theft of fuel tank from the tank by siphoning it out through a small pipe inserted down through the inlet pipe. In some instances, the anti-theft mechanisms are mandated by law for vehicles that have engines using fuel with alcohol content of 20% or above. However, increased flow resistance to fuel flowing along the inside wall of the inlet pipe is a problem associated with inlet pipes that are provided with the grating members. Possible means for addressing this problem would include increasing flow passage diameter or making the pipe routing as straight as possible in consideration of the increased flow passage resistance to fuel caused by the grating member.

However, where the inlet pipe furnished with the grating member is employed in a vehicle that uses gasoline as fuel, inlet pipe diameter may be larger than needed, or limitations may be imposed on pipe routing arrangements, making such designs unsuited to specifications intended to be used in common for gasoline-powered cars.

SUMMARY

An advantage of some aspects of the invention is to provide a highly universal fueling device having minimal flow passage resistance to fuel during fueling, and adaptable for use in vehicles of various types.

According to an aspect of the invention is provided with a fueling device for fueling a fuel tank through an inlet opening disposed in a fuel passage of a fueling pipe, the fueling device including a grating member disposed in the fuel passage. The grating member includes an annular body situated substantially concentrically with the fuel passage, and a support body adapted to connect the annular body and an inside wall of the fueling pipe. The inside wall of the fueling pipe, the annular body and the support body constitute part of the fuel passage therebetween.

According to the fueling device disclosed in the first mode, if a small pipe is slipped into the fuel passage from the inlet, the tip of the pipe will hit against the grating member which has been provided in the fuel passage, thus preventing the pipe from reaching down the fuel level in the fuel tank. Accordingly, it will not be possible to siphon out fuel from the fuel tank through a pipe, so that theft of fuel can be prevented.

During fueling, fuel flowing through the fuel passage from the fuel gun will pass through gaps between the annular body and the support body and then flow into the fuel tank. In the design of the grating member, the annular body is principally responsible for the function of restricting insertion of a pipe, while the support body simply serves to support the annular body on the inside wall of the fueling spout. Thus, sections in the support body that extend upright from the inside wall of the fueling spout can be minimized so as to not disturb the initial flow of fuel along the inside wall of the fueling spout, and so as to not give rise to increasing flow passage resistance with subsequent increase of the flow of fuel, thus allowing the fueling operation to proceed unimpaired.

In a second mode, the support body is situated extending radially from the center of the fuel passage. This arrangement affords larger passage area in the lower part of the fuel passage, and will not lead to increased flow passage resistance by the support body.

In a third mode, the annular body and the support body have triangular cross section adapted to reduce flow passage resistance to fuel from the inlet towards the fuel tank. This arrangement affords lower flow passage resistance when fuel flowing through the fuel passage collides with the annular body and with the support body of the grating member.

These and other objects, features, aspects, and advantages of the present invention will become more apparent from the following detailed description of the preferred embodiments with the accompanying drawings.

DESCRIPTION OF THE PREFERRED EMBODIMENTS

(1) General Configuration of Fueling Device FD

Figure 1:
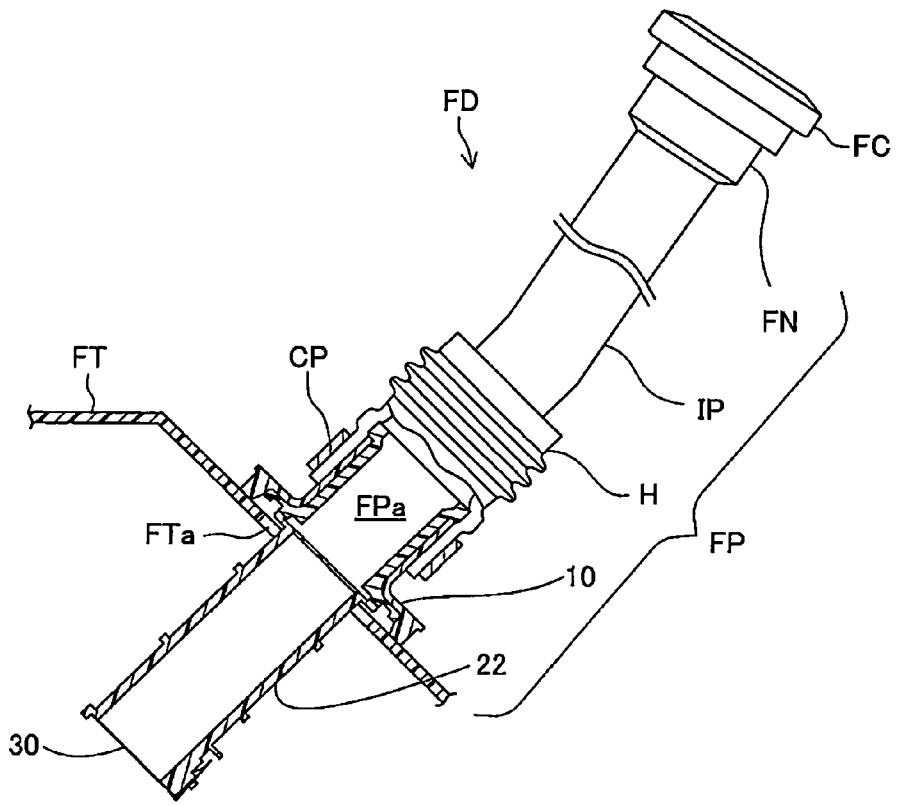
FIG. 1 shows a fueling device for supplying fuel to a fuel tank of an automobile.

FIG. 1 is a schematic diagram showing a fueling device FD for supplying fuel to a fuel tank FT of an automobile. As shown in FIG. 1, the fueling device FD is connected to the fuel tank FT, and is adapted to deliver fuel supplied from a fuel gun (not shown) to the fuel tank FT; the system includes a fueling pipe FP that defines a fuel passage FPa leading from the inlet to the fuel tank FT. The fueling pipe FP is furnished with a filler neck FN that has an inlet adapted to be opened or closed by a fuel cap FC; an inlet pipe IP made of metal or resin and connected to one end of the filler neck FN; an inlet hose H connected to the inlet pipe IP; a fuel tank connector 10 that is connected to one end of the inlet hose H and welded to the fuel tank FT; and a passage-defining member 22 that has been welded to the fuel tank connector 10. The inlet hose H is pressure-fit or inserted into the fuel tank connector 10 and is fastened with a clamp CP or connector. A check valve 30 is installed at the distal end of the passage-defining member 22. In the filler neck FN, a breather pipe (not shown) connects to the fuel tank FT. According to this design of the fueling device FD, when the fuel cap FC is detached and fuel is pumped into the filler neck FN from the fueling gun during fueling, the fuel will flow through the inlet pipe IP, the inlet hose H, the fuel tank connector 10, and the passage-defining member 22, and then be delivered to the fuel tank FT through the open check valve 30. When fueling is stopped on the other hand, since the check valve 30 will assume the closed position, the fuel will be prevented from being pushed back and flowing outside due to a rise in tank internal pressure.

(2) Configuration and Operation of Parts

The configuration of the various parts will be described below.

(2)-1 Fuel Tank FT

The fuel tank FT is composed of multiple layers of resin that include a barrier layer made of highly fuel-impervious ethylene vinyl alcohol copolymer (EVOH), and an outside layer made of polyethylene (PE). A tank opening FTa is formed in the top part of the side wall of the fuel tank FT, and the fuel tank connector 10 is welded so as to encircle the tank opening FTa.

(2)-2 Fuel Tank Connector 10

Figure 2:
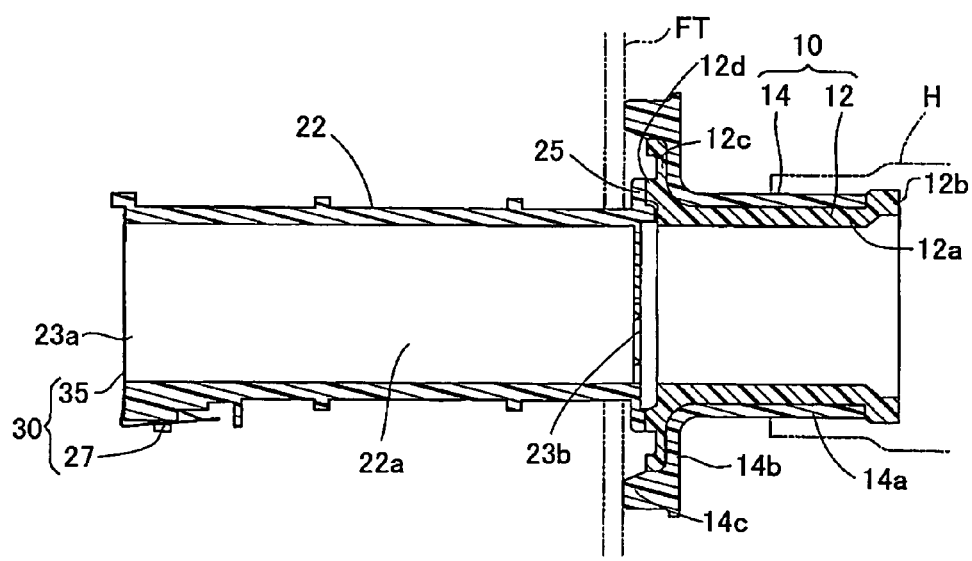
FIG. 2 is an enlarged sectional view of the area of the fuel tank connector and the passage-defining member of the fuel tank.

FIG. 2 is an enlarged sectional view of the area of the fuel tank connector 10 and the passage-defining member 22 of the fuel tank FT. The fuel tank connector 10 is composed of a passage-defining member 12 and a connector welding part 14 which have been integrally formed through two-color molding. The passage-defining member 12 is furnished with a passage portion 12*a* that defines a passage connected to the inlet hose H. A first end of the passage portion 12*a* flares out from the outside peripheral edge of the passage portion 12*a* to produce a flared detent portion that is adapted to detain the inlet hose H. A flange 12*c* is formed at the other end of the passage portion 12*a*. One face of the flange 12*c* is a face that is adapted to be welded to the inside wall of the connector welding part 14, while the other face is a welding portion 12*d* that is adapted to be welded to one end of the passage-defining member 22. The passage-defining member 12 is made of a polyamide (PA) such as nylon-12 for example. The connector welding part 14 includes an outer tube portion 14*a*, a flange 14*b* that flares out from the perimeter at one end of the outer tube portion 14*a*, and a welding end 14*c* of annular contours projecting from one end face of the flange 14*b*. The connector welding part 14 is made of modified polyethylene, which is thermally weldable to the fuel tank FT. Modified polyethylene is a resin material derived through addition of polar functional groups, e.g. maleic acid-modified functional groups, to polyethylene (PE), and it undergoes reactive bonding with PA when exposed to heat during injection molding. Thus, the connector welding part 14 will become welded and unified with the passage-defining member 12 through reactive bonding during the two-color molding process.

(2)-3 Configuration of Passage-Defining Member 22 and Check Valve 30

The passage-defining member 22 is a tube shape made of the same PA material as the passage-defining member 12, having in its interior a passage 22*a* adapted to connect to the inlet hose H, and whose end lying towards the inlet hose H constitutes an inlet 23*b*. The end of the inlet 23*b* of the passage-defining member 22 has a flange 25 and is unified by welding with welding portion 12*d* of the passage-defining member 12, thereby defining a passage.

Figure 3:
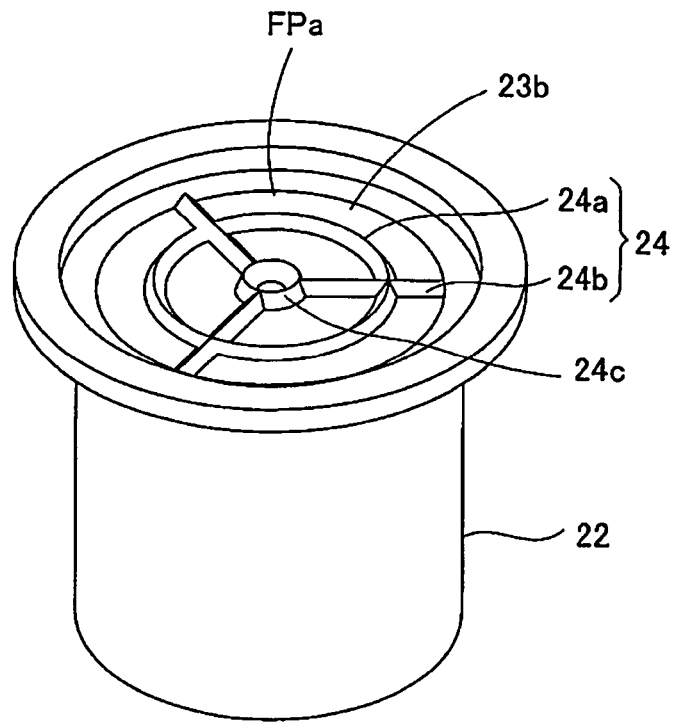
FIG. 3 is a perspective view showing the end part of the passage-defining member.
Figure 4:
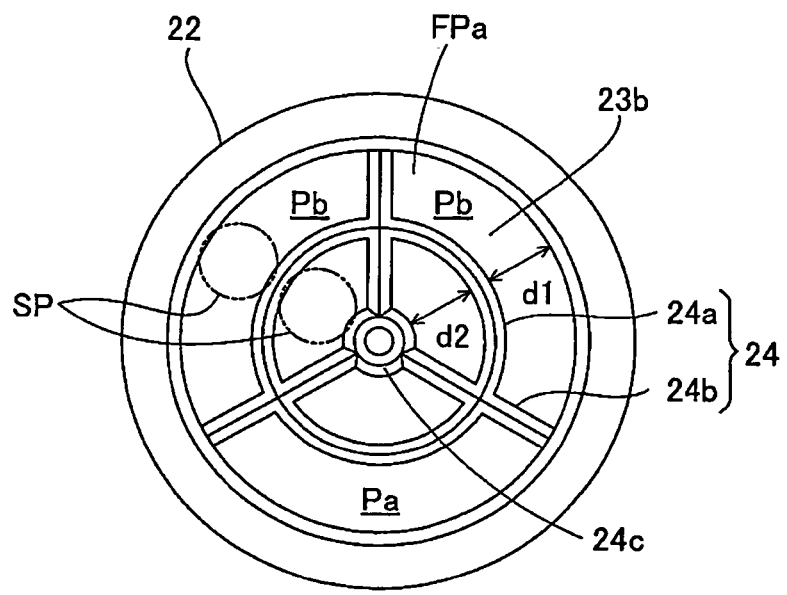
FIG. 4 is a plan view of the end part of the passage-defining member.

FIG. 3 is a perspective view showing the end part of the passage-defining member 22; and FIG. 4 is a plan view of the end part of the passage-defining member 22. A grating member 24 that extends across the inlet 23*b* is integrally formed in the end part of the passage-defining member 22. The grating member 24 includes an annular body 24*a* and a support body 24*b*. The annular body 24*a* is positioned concentrically with the inlet 23*b*. The support body 24*b* is composed of three spokes spaced apart at 120° intervals in the circumferential direction that extend radially from a connecting body 24*c* situated at the center of the inlet 23*b*, to connect with the inside wall of the passage-defining member 22 and intersect at their midpoint the annular body 24*a* so as to provide support to the annular body 24*a*. The cross sectional shape of the annular body 24*a*, the support body 24*b*, and the connecting body 24*c* is an isosceles triangle; the apex side of the triangle is faces towards the inlet into which the fuel inflows, while the basal face side faces towards the fuel tank FT. As shown in FIG. 4, the gaps between the annular body 24*a* and the support body 24*b* define a lower flow passage Pa and side flow passages Pb, Pb that constitute part of the fuel passage FPa; these flow passages Pa, Pb have been set to a distance such that a pipe SP for theft purposes larger than a prescribed diameter cannot be inserted through them. For example, to prevent insertion of a pipe SP 5.2 mm or larger in diameter, the distance d1 between the annular body 24*a* and the inside wall of the passage-defining member, and the distance d2 between the annular body 24*a* and the connecting body 24*c*, would be respectively set to 5.2 mm or smaller.

Figure 5:
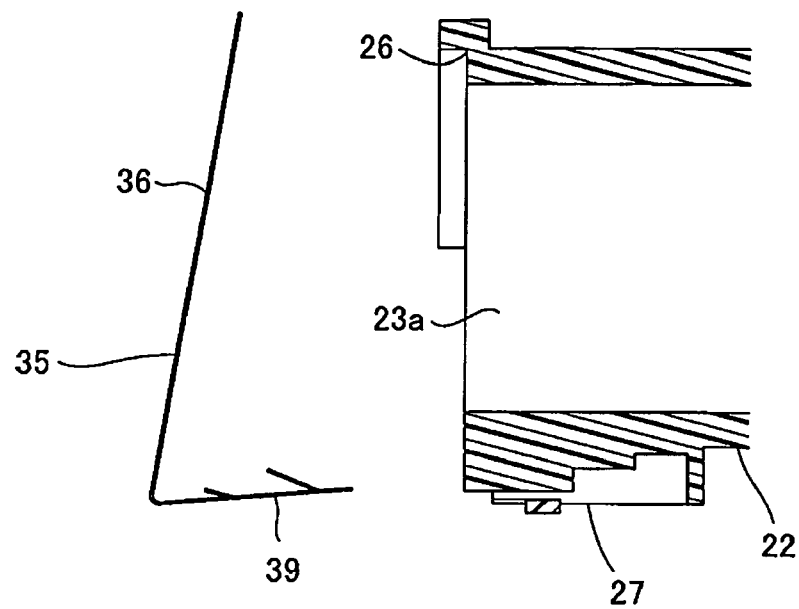
FIG. 5 is an enlarged sectional view prior to attachment of the valve plate to the mounting portion of the passage-defining member.
Figure 6:
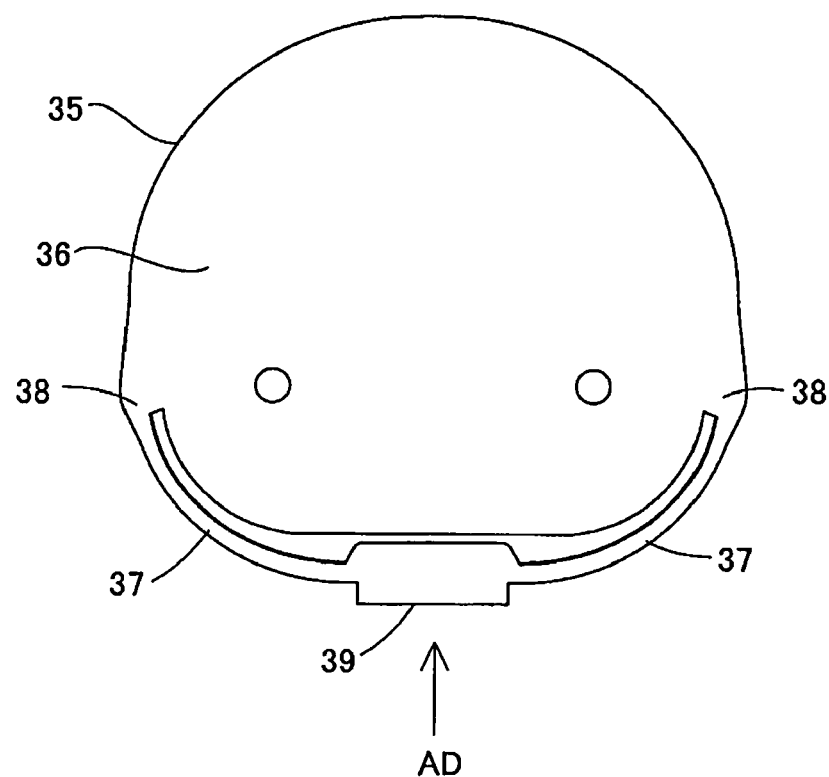
FIG. 6 is a plan view showing the valve plate.
Figure 7:
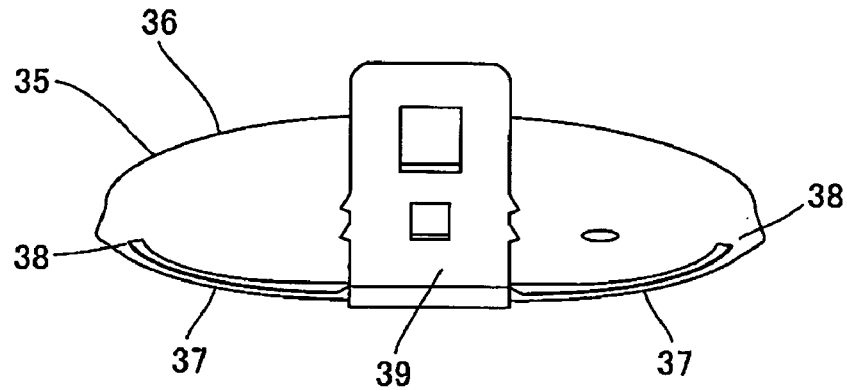
FIG. 7 shows the structure viewed from the direction indicated by arrow AD in FIG. 6.

As depicted in FIG. 2, the check valve 30 is furnished with a mounting portion 27 formed at the outside peripheral edge part of the passage-defining member 22, and with a valve plate 35 attached to the mounting portion 27 and adapted to open and close the outlet 23*a*. FIG. 5 is an enlarged sectional view prior to attachment of the valve plate 35 to the mounting portion 27 of the passage-defining member 22. FIG. 6 is a plan view showing the valve plate 35; and FIG. 7 is a drawing viewed from the direction indicated by arrow AD in FIG. 6. The valve plate 35 has been produced by press cutting of thin sheet metal to produce an integral plate spring having a closure portion 36, arm portions 37, 37, connecting portions 38, 38, and an attachment portion 39. The closure portion 36 is substantially identical in shape to the contours of the seat portion 26 shown in FIG. 5, and is adapted to open and close the outlet 23*a*, that is, to alternately touch or release from the seat portion 26. The arm portions 37, 37 are formed so as to encircle the outside peripheral part of the closure portion 36 in an approximate semicircle. The arm portions 37, 37 respectively connect at a first end to the closure portion 36 via the connecting portions 38, 38, and connect at the other end to the attachment portion 39. The attachment portion 39 is a zone that has been designed to be inserted into the mounting portion 27 depicted in FIG. 5 in order to support the closure portion 36 in an openable and closeable manner, and is bent with respect to the closure portion 36.

Figure 8:
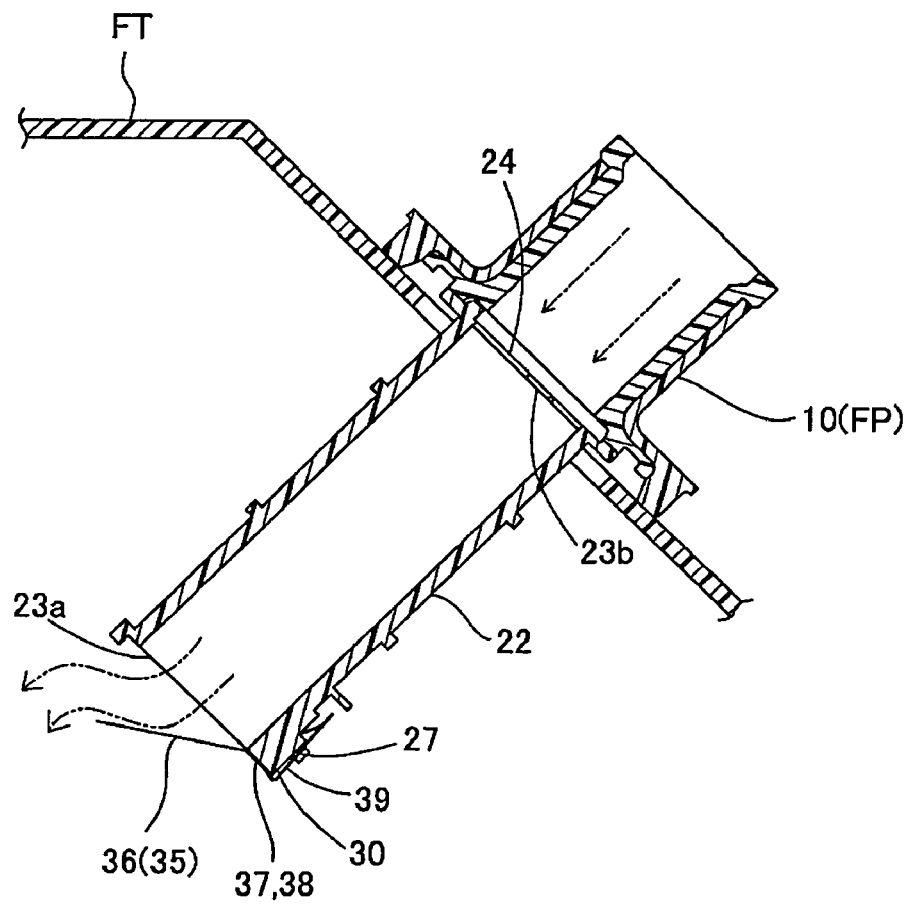
FIG. 8 shows the operation of the fueling device.

As depicted in FIG. 8, with the check valve 30 of the above design, fuel flowing through the fuel tank connector 10 of the fueling pipe FP during fueling will pass through the grating member 24 situated in the inlet 23*b*, and upon reaching the outlet 23*a*, will push the closure portion 36 of the valve plate 35. Since the valve plate 35 is mounted on the mounting portion 27 by the attachment portion 39, it will open up with the attachment portion 39 as its fulcrum. That is, when the closure portion 36 is pushed by the fuel, the closure portion 36 will incline with respect to the arm portions 37, 37 about the connecting portions 38, 38 shown in FIG. 6, thereby opening the outlet 23*a* and allowing fuel to flow through.

(3) Working Effects of the Embodiment

The embodiment described above affords the following working effects, in addition to the working effects mentioned above.

(3)-1 If as depicted in FIG. 4 a pipe SP for theft purposes is slipped into the fuel passage FPa from the inlet, the tip of the pipe SP will hit against the grating member 24 which has been provided in the fuel passage FPa, thus preventing it from reaching down the fuel level in the fuel tank. Accordingly, it will not be possible to siphon out fuel from the fuel tank through the pipe SP, so theft of fuel can be prevented.

Figure 9:
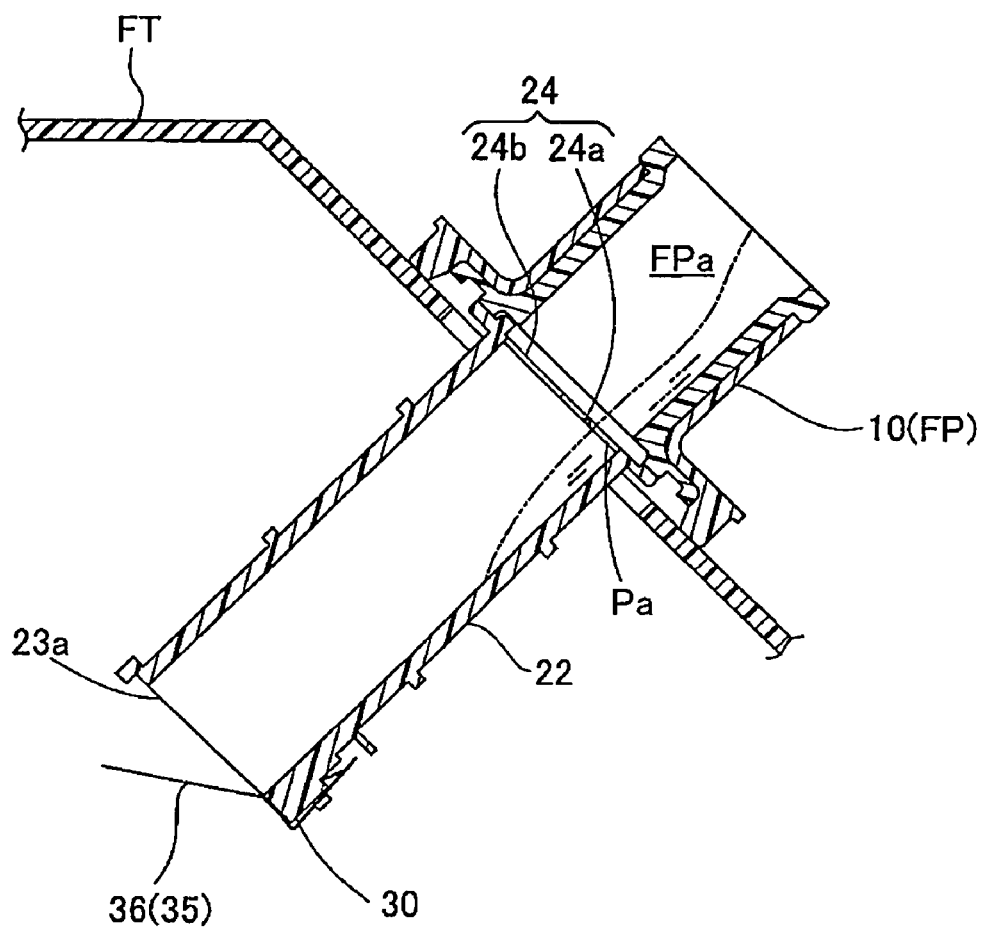
FIG. 9 shows the operation of the grating member of the fueling device.

(3)-2 During fueling as depicted in FIG. 8, fuel flowing from the fuel gun through the fuel passage FPa will pass through the lower flow passage Pa and the side flow passage Pb, Pb between the annular body 24a and the support body 24b, and be delivered to the fuel tank. The flow of fuel passing through the flow passage of the grating member 24 at this time is analyzed as follows. Specifically, the flow fuel from the fuel gun gradually increases and then reaches a substantially constant rate; as depicted in FIG. 9, during initial fueling the fuel will flow along the pipe wall at the lower side of the passage-defining member 22, then flow principally through the lower flow passage Pa of the grating member 24 and on towards the fuel tank side. In the grating member 24, the annular body 24a is situated concentrically with respect to the inside pipe wall of the passage-defining member 22, and moreover the support body 24b which supports the annular body 24a imparts to the lower flow passage Pa a large flow passage area such that this flow will not be blocked, so at this time initial flow disturbance along the inside pipe wall of the passage-defining member 22 will be kept to a minimum. When the fuel subsequently increases to a constant flow flowing through substantially the entire area of the fuel passage FPa, due to the rapid flow velocity the flow will not be disturbed by the grating member 24 and will continue to pass through rapidly in a regulated flow. Consequently, the grating member 24 will not give rise to flow disturbance of fuel flowing along the inside wall of the passage-defining member 22 during initial fueling, nor will it give rise to increased flow passage resistance to fuel that subsequently flows through, so that the fueling operation may proceed unimpaired.

(3)-3 As shown in FIG. 3, the annular body 24a and the support body 24b have triangular cross section adapted to minimize flow resistance to fuel from the inlet side towards the fuel tank FT side, and thereby afford lower flow resistance when fuel flowing through the fuel passage FPa collides with the annular body 24a, the support body 24b, and the connecting body 24c of the grating member 24.

(3)-4 Since the grating member 24 does not increase fuel flow resistance, the device can be implemented not only in tanks for alcohol based fuels, but also in fuel tanks for gasoline having the same fueling pipe FP diameter as in the prior art, making highly universal.

The present invention is not limited to the embodiment set forth hereinabove, and may be embodied in various modes without departing from the spirit thereof, as shown for example by the following modified embodiment.

While the grating member 24 in accordance with the preceding embodiment is designed with the single annular body 24a supported by the three support body 24b, no particular limitation is imposed thereby, it being possible to provide a plurality of annular bodies; nor are there any limitations as to the placement of the support body 24b, provided that it provides support to the annular body 24a.

While the grating member 24 is here disposed in the fueling pipe FP at a location close to the wall face of the fuel tank, no particular limitation is imposed thereby and it would be possible to instead dispose it on the inlet pipe IP or inlet hose H which are close to the filler neck FN; nor are there any limitations as to the location thereof provided that insertion of the fuel gun is not impeded. The grating member 24 may be integrally formed with the passage-defining member 22, or provided as a separate component for attachment to the fueling pipe.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fueling device for fueling a fuel tank through an inlet opening disposed in a fuel passage of a fueling pipe, the fueling device including a grating member disposed in the fuel passage,
    wherein the grating member includes an annular body situated substantially concentrically with the fuel passage, and a support body adapted to connect the annular body and an inside wall of the fueling pipe, wherein the inside wall of the fueling pipe, the annular body and the support body constitute part of the fuel passage therebetween,
    wherein the annular body and the support body have a triangular cross section adapted to reduce flow passage resistance to fuel from the inlet opening towards the fuel tank, wherein an apex side of the triangular cross section faces towards the inlet into which the fuel inflows, while a basal face side faces towards the fuel tank.

2. The fueling device according to claim 1, wherein the support body comprises a plurality of spokes that are situated extending radially from a center of the fuel passage and formed integrally with the annular body.

3. The fueling device according to claim 1, wherein the grating member is integrally formed with the fueling pipe.

4. The fueling device according to claim 1, wherein the grating member is integrally formed with the fueling pipe.

5. A fueling device provided in a fuel passage, which comprises the fuel passage including a fueling pipe arranged between a fuel tank for holding fuel and a fuel inlet for receiving fuel, the fueling device including a grating member disposed in the fuel passage, and
    the grating member including an annular body situated substantially concentrically within the fuel passage and a support body connecting the annular body; whereby an inside wall of the fueling pipe, the annular body and the support body constitute part of the fuel passage; both the annular body and the support body having a triangular cross section adapted to reduce flow passage resistance to fuel from the fuel inlet towards the fuel tank along the fuel passage, the triangular cross section extending in an axial direction of the fuel passage, and triangular cross section having an apex facing the fuel inlet and a base facing the fuel tank.

6. The fueling device according to claim 5, wherein the support body comprises a plurality of spokes that extend radially from a center of the fuel passage and are formed integrally with the annular body.

7. The fueling device according to claim 5, wherein the grating member and the fueling pipe are integrally formed.

8. The fueling device according to claim 6, wherein the grating member and the fueling pipe are integrally formed.

* * * * *